(12) United States Patent
Heim et al.

(10) Patent No.: US 8,961,022 B2
(45) Date of Patent: Feb. 24, 2015

(54) ROLLING BEARING FOR ROTATIVELY MOUNTING A MACHINE ELEMENT

(75) Inventors: Jens Heim, Bergrheinfeld (DE); Robert Heuberger, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/878,246

(22) PCT Filed: May 26, 2011

(86) PCT No.: PCT/EP2011/058617
§ 371 (c)(1),
(2), (4) Date: Jul. 2, 2013

(87) PCT Pub. No.: WO2012/045487
PCT Pub. Date: Apr. 12, 2012

(65) Prior Publication Data
US 2013/0272636 A1    Oct. 17, 2013

(30) Foreign Application Priority Data
Oct. 8, 2010   (DE) .................. 10 2010 047 928

(51) Int. Cl.
*F16C 41/00*    (2006.01)
*F16C 19/52*    (2006.01)
*F16C 33/58*    (2006.01)
*G01L 5/00*    (2006.01)

(52) U.S. Cl.
CPC .............. *F16C 19/522* (2013.01); *F16C 19/52* (2013.01); *F16C 33/58* (2013.01); *G01L 5/0019* (2013.01)
USPC ........................................ 384/448

(58) Field of Classification Search
CPC   F16C 41/007; B60B 27/0068; G01D 11/245; G01K 13/08; G01L 5/0009; G01L 5/0019; G01P 3/443
USPC ........... 384/448; 73/114.81, 862.541, 862.55; 324/160–163
See application file for complete search history.

(56) References Cited

U.S. PATENT DOCUMENTS

| | | | |
|---|---|---|---|
| 5,085,519 A | 2/1992 | Dougherty | |
| 5,140,849 A | 8/1992 | Fujita et al. | |
| 6,535,135 B1 | 3/2003 | French et al. | |
| 6,658,943 B2 * | 12/2003 | McDearmon | ................... 73/795 |

(Continued)

FOREIGN PATENT DOCUMENTS

| | | |
|---|---|---|
| DE | 10136438 | 3/2002 |
| DE | 10102236 | 8/2002 |

(Continued)

*Primary Examiner* — Phillip A Johnson
(74) *Attorney, Agent, or Firm* — Simpson & Simpson, PLLC

(57) ABSTRACT

The present invention relates to a rolling bearing for rotatively mounting a machine element, including a sensor for measuring a mechanical load acting on the rolling bearing. The rolling bearing can be a wheel bearing of a motor vehicle, for example, or the bearing of a gearbox shaft. The rolling bearing includes a first bearing ring and a second bearing ring, which can be rotated with respect to the first bearing ring. A bearing inner space, which has at least one first axial section in which rotatable rolling elements are arranged, is formed between the first bearing ring and the second bearing ring. The rolling bearing further includes at least one sensor for measuring a mechanical load acting on the rolling bearing, in particular for measuring a force or torque, or a physical variable derived from a force or torque, for example, angular momentum or mechanical tension.

12 Claims, 5 Drawing Sheets

(56) References Cited

U.S. PATENT DOCUMENTS

| | | | |
|---|---|---|---|
| 6,948,856 B2 * | 9/2005 | Takizawa et al. | 384/448 |
| 2007/0098311 A1 * | 5/2007 | Iwamoto et al. | 384/448 |
| 2008/0159674 A1 * | 7/2008 | Varonis | 384/448 |
| 2008/0170817 A1 | 7/2008 | McDearmon | |

FOREIGN PATENT DOCUMENTS

| | | |
|---|---|---|
| DE | 10105298 | 8/2002 |
| DE | 102006016476 | 11/2007 |
| EP | 2006653 | 12/2008 |
| JP | 01206113 A * | 8/1989 |

* cited by examiner

ROLLING BEARING FOR ROTATIVELY MOUNTING A MACHINE ELEMENT

CROSS-REFERENCE TO RELATED APPLICATIONS

The present application is the U.S. national stage application pursuant to 35 U.S.C. §371 of International Patent Application No. PCT/EP2011/058617, filed May 26, 2011, which claims priority from German Patent Application No. 10 2010 047 928.4, filed Oct. 8, 2010, which applications are incorporated herein by reference in their entireties.

FIELD OF THE INVENTION

The present invention relates to a rolling bearing for rotatively mounting a machine element with a sensor for measuring the mechanical load acting on the rolling bearing.

From the measured data for the mechanical load, further data such as the angular momentum or rotational speed of the rolling bearing can be derived. The rolling bearing can be a wheel bearing for a motor vehicle, for example, or the bearing of a gearbox shaft.

BACKGROUND OF THE INVENTION

German Patent No. 101 36 438 A1 shows a sensor configuration, which is suitable for detecting the physical magnitude of movement in a component fitted within a rolling bearing. The rolling bearing has an outer bearing shell, where identical grooves, each with a resistant strain gauge, are arranged on diametrically opposed sides.

German Patent No. 101 05 298 C1 shows a wheel bearing device for measuring the contact forces between a tire and the road. At the stationary part of the wheel bearing, sensors are arranged in order to measure the forces acting in the wheel bearing. These sensors are positioned on the outside of the stationary ring element of the wheel bearing. Furthermore, sensors are arranged on the bearings of a brake caliper in order to be able to continuously assess the braking forces.

From U.S. Pat. No. 5,085,519 a bearing arrangement is established, in which a speed sensor is integrated. The speed senor is mounted in a recess in the bearing outer ring and rises into a bearing interior, where it stands facing a coding ring attached to a bearing inner ring. The speed sensor rises diagonally into the bearing outer ring and into the bearing interior. In order to accommodate the speed sensor, the bearing arrangement does not have to be extended, or only insignificantly in an axial manner.

German Patent No. 101 02 236 A1 shows an arrangement for recording physical measurements of a wheel bearing of a motor vehicle. In particular, force, torque, pressure and/or acceleration in the wheel bearing of the motor vehicle are measured. A sensor device, with which at least one transferable physical measurement can be ascertained from a rotatable component on the wheel bearing, is provided. An additional device attached to the wheel bearing is provided, in order to influence the rotation speed of the rotatable component. The sensor device and the additional device on the wheel bearing are arranged relative to each other in such a way that when influencing the rotation speed of the rotatable component with a force induced by the additional device, a direct transfer of part of this force from the additional device to the sensor device does not occur.

BRIEF SUMMARY OF THE INVENTION

The object of the present invention is the ability to measure the mechanical loads in their different dimensions without, in doing so, being particularly restricted to measuring on a stationary ring of the rolling bearing.

The rolling bearing of the present invention serves to rotatively mount a machine element, for example, the mounting of a powered or unpowered wheel of a motor vehicle such as a truck or a passenger car. The rolling bearing of the present invention can, however, also be used for rotatively mounting other machine elements, such as a gearbox shaft, e.g., the gearbox shaft of a motor vehicle. The rolling bearing includes a first bearing ring and a second bearing ring, which can be rotated with respect to the first bearing ring. Between the first bearing ring and the second bearing ring there is a bearing interior, which has at least one first axial section in which rotatable rolling elements are arranged. In this respect, the rolling bearing of the present invention is identical to conventional rolling bearings. The rolling bearing of the present invention includes at least one sensor for measuring mechanical load acting on the rolling bearing, in particular, for measuring a force or torque or a physical variable derived from the force or torque such as an angular force or mechanical tension. The measured or derived variable can also be measured in relation to a time, for example, in order to determine a revolution speed of the rolling bearing with a periodical force/momentum measurement. The additional use of the measured time-related variable can take place alternately or supplementary to the additional use of the variable representing the mechanical load. In particular, the sensor serves to measure strain arising in the rolling bearing due to the mechanical load acting on the rolling bearing. According to the invention, the sensor is arranged in a second axial section of the bearing interior. The second axial section of the bearing interior is distinct from the first axial section, so that the first axial section of the bearing interior and the second axial section of the bearing interior represent separate sections of the bearing interior. The second axial section of the bearing interior serves to arrange the sensors in such a way that in this second axial section of the bearing interior there are no rolling elements. The rolling bearing of the present invention can have additional axial sections in the bearing interior, resulting from the function of the rotatively mounted machine element. For example, the rolling bearing of the present invention can have additional axial sections in the bearing interior in which additional rolling elements are arranged.

Further axial sections in the bearing interior can also be planned to limit the movement of the rolling element bearing, for example, with an axial section in the bearing interior, where a board is to be designed. The second axial section in the bearing interior can, for example, be located close to the board. Axial sections in the bearing interior can also be planned to include a sealing gasket in the bearing interior. In any case, the second axial section in the bearing interior, where the sensor is to be located, constitutes an axial extension of a rolling element bearing known from previous art. The second axial section may also be seen as an extension of both bearing rings, for example, as an extension of a bearing interior ring.

An advantage of the rolling element bearing is that it allows several measurements to be taken of the mechanical load acting on the rolling element bearing, for example, the forces and torques acting on a stationary inner ring of the wheel bearing of a truck. The weight acting on the wheels of a static vehicle can be determined, for example. It is also possible to determine the static weight on the wheels and the axles of a vehicle's trailer. The mechanical load measured on a rolling element bearing of the present invention can be assessed using further systems to make it possible to identify different bearing loads to, for example, determine their lifespan.

The sensor of the rolling element bearing of the present invention is constructed with at least one wire gauge strain, which is attached to the surface of the first bearing ring in the bearing interior. It can be attached with glue or laser welding. Several wire gauge strains can also be planned, which would be attached to axial or extensive sections of the surface of the first bearing ring or to the surface of the second bearing ring in the bearing interior as well. Alternatively, other sensors suitable to measure mechanical load can be used; for example, piezoceramic force sensors. Measuring the mechanical load of the strain caused to the material of the rolling element bearing in this way, for example, can also be done indirectly; for example, optically, where the direct measurement of speed alone does not constitute a measurement of the mechanical load.

In one embodiment of the present invention, the rolling element bearing would locate a temperature sensor in the second axial section of the bearing interior. The temperature sensor serves to measure the bearing temperature and is to be favorably integrated in a sensor unit alongside the sensor to measure mechanical stress acting on the rolling element bearing. The sensor unit can be used for any and several measurements in rolling element bearings, for example, to measure the speed and/or the wheel force and/or the temperature of the rolling element bearing. The temperature sensor can also be constructed with a wire strain gauge. The temperature sensor and the sensor to measure the mechanical load acting on the rolling element bearing are to be constructed using the same wire strain gauge, which shall equally form the sensor unit.

The sensor to measure the mechanical load acting on the rolling element bearing including the temperature sensor, if needed, can be planned to connect electronically to an evaluation unit with a cable. The sensor used to measure the mechanical load acting on the rolling element bearing including the temperature sensor, if needed, is, nonetheless, constructed to enable the transfer of measure values by telemetry. As a consequence, a cable would not have to be led from one of the bearing rings to a machine element incorporating this bearing ring, meaning that this bearing ring would not have to be fixed in a circumferential direction. A transmitting antenna required for the telemetry is integrated in both bearing rings in the form of a circular antenna and located coaxially to this bearing ring. The circular antenna can be located at an axial abutting face of the bearing ring, for example, in a radial groove or in a sealing gasket in the rolling element bearing.

The sensor for the measurement of a mechanical load affecting the rolling bearing, including the temperature sensor, if present, is electrically connected to the transmitting antenna via a cable inside the bearing ring.

The second axial section of the bearing interior is positioned between the first axial section of the bearing interior and a third axial section of the bearing interior, so that the second axial section of the bearing interior with the sensor positioned within it is situated within an internal axial area of the bearing interior, where the sensor is placed in a protected position. In the third axial section of the bearing interior, other rolling elements can, for example, be positioned, or a rim to restrict the course of the rolling elements can be constructed.

In one embodiment of the rolling bearing of the invention is designed as a double-row rolling bearing. The rolling elements in the first axial section of the bearing interior and the rolling elements in the third axial section of the bearing interior each form a row of the double-row rolling bearing. Double-row rolling bearings allow the absorption of sizeable mechanical loads, as that occur, for example, in the wheel bearings of a truck.

The second axial section is positioned in the middle between the two rows of rolling elements of the double-row rolling bearing. In this way, the sensor is protected from external influences and enables the measurement of the mechanical loads occurring in a core area of the rolling bearing. The second axial section of the bearing interior can also be designed in two parts; in particular, if one of the two bearing rings is designed as two halves, which bump against each other at a coupling point. This coupling point can be positioned in the second axial section of the bearing interior, where this is in two parts and enables the positioning of two of the sensors in the second section of the bearing interior.

One embodiment of the rolling bearing of the invention is designed as a wheel bearing for the bearing of a wheel of a truck. Particularly, when the rolling bearing is used as a wheel bearing of a truck, important applications arise for the enhanced measuring of mechanical loads, such as, for example, the measurement of weight forces, which affect the wheel. The rolling elements of the rolling bearing, in particular in the case of wheel bearings, consist of tapered rollers.

The first bearing ring is formed by a bearing inner ring, while the second bearing ring is formed by a bearing outer ring. Where the embodiment of the rolling bearing is a wheel bearing, the bearing outer ring will be joined torsional-tested to a hub of the wheel while the bearing inner ring will be mounted torsional-tested onto a pivot. This embodiment with a stationary inner ring is particularly advantageous in the case of trucks. The bearing outer ring can be designed integrally with the hub. Alternatively, the first bearing ring can also be formed by the bearing outer ring, while the second bearing ring is formed by the bearing inner ring. The invention is also not restricted in terms of which bearing ring is designed to be stationary in the intended application.

The second axial section of the interior of the bearing has an axial length which is determined with regard to an internal diameter of the one of the two bearing rings, which forms the bearing inner ring. The axial length is defined in the direction of the axis of the rolling bearing and can, in the case of a vertical perspective on the axis of the rolling bearing, also be taken as the breadth of the two axial sections of the roller interior of the bearing. The inner diameter of the bearing inner ring is formed, for example, from the diameter of a borehole in the bearing outer ring, which serves as the slot of a pivot or a shaft. The axial length of the second axial section of the bearing interior is at least as large as a tenth of the inner diameter of the bearing inner ring.

Furthermore, the axial length of the second axial section of the bearing interior is at least as large as one third of the inner diameter of the bearing inner ring. The axial length of the second axial section of the bearing interior amounts to at least 4 mm. In view of the fact that one tenth of the inner diameter of the bearing inner ring is greater than 10 mm, the axial length of the second axial section of the bearing interior amounts to at least only 10 mm. The described axial lengths of the second axial section of the bearing interior allow the arrangement of one or more of the sensors, which enable exact measurements of the mechanical stresses acting on the rolling bearing. The favored threshold values stated can also fall short or be exceeded for other embodiments of the invention.

In one embodiment, the rolling bearing is formed in such a way that the measured values of the sensors can be used to determine the speed of the rolling bearing, the load exerted on the rolling bearing and/or temperature prevailing on the rolling bearing. By doing so, the rolling bearing includes an evaluation unit, which is electrically connected to the sensor. The evaluation unit can be formed as an integral component of the rolling bearing or arranged outside the rolling bearing. The evaluation unit is configured to determine the speed of the rolling bearing, the load exerted on the rolling bearing, and/or the temperature prevailing on the rolling bearing. The speed in particular, can have to do with the rotation speed of a wheel, which is embedded by the rolling bearing as a wheel bearing. The load exerted on the rolling bearing can particularly, have to do with a wheel force, which has an impact on the rolling bearing pictured as a wheel bearing. The temperature prevailing on the rolling bearing can have to do with a temperature of the bearing interior of the rolling bearing pictured as a wheel bearing. The measurement of the speed of the rolling bearing, which exerts force on the rolling bearing and/or a prevailing temperature on the rolling bearing, is substantiated with such embodiments of the rolling bearing, where the sensor is formed by one or more strain gauges. The strain gauges in their circumferential length are smaller than the dimensioned distance of the rolling bearing for a measurement of speed, so that rolling past each of the rolling bearings leads to an additional mechanical stress of the strain gauges, which leads to a measurement signal component out of which the speed pulses can be derived. The measured values of the strain gauges must be evaluated accordingly for the measurement of the forces occurring at the rolling bearing. At least a few of the strain gauges are arranged in such areas of the rolling bearing to measure the temperature prevailing on the rolling bearing, which are subject to none or very low mechanical stresses. These strain gauges are interconnected as quarter bridges so that the electric resistance of the interconnected strain gauges is dependent on the temperature.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
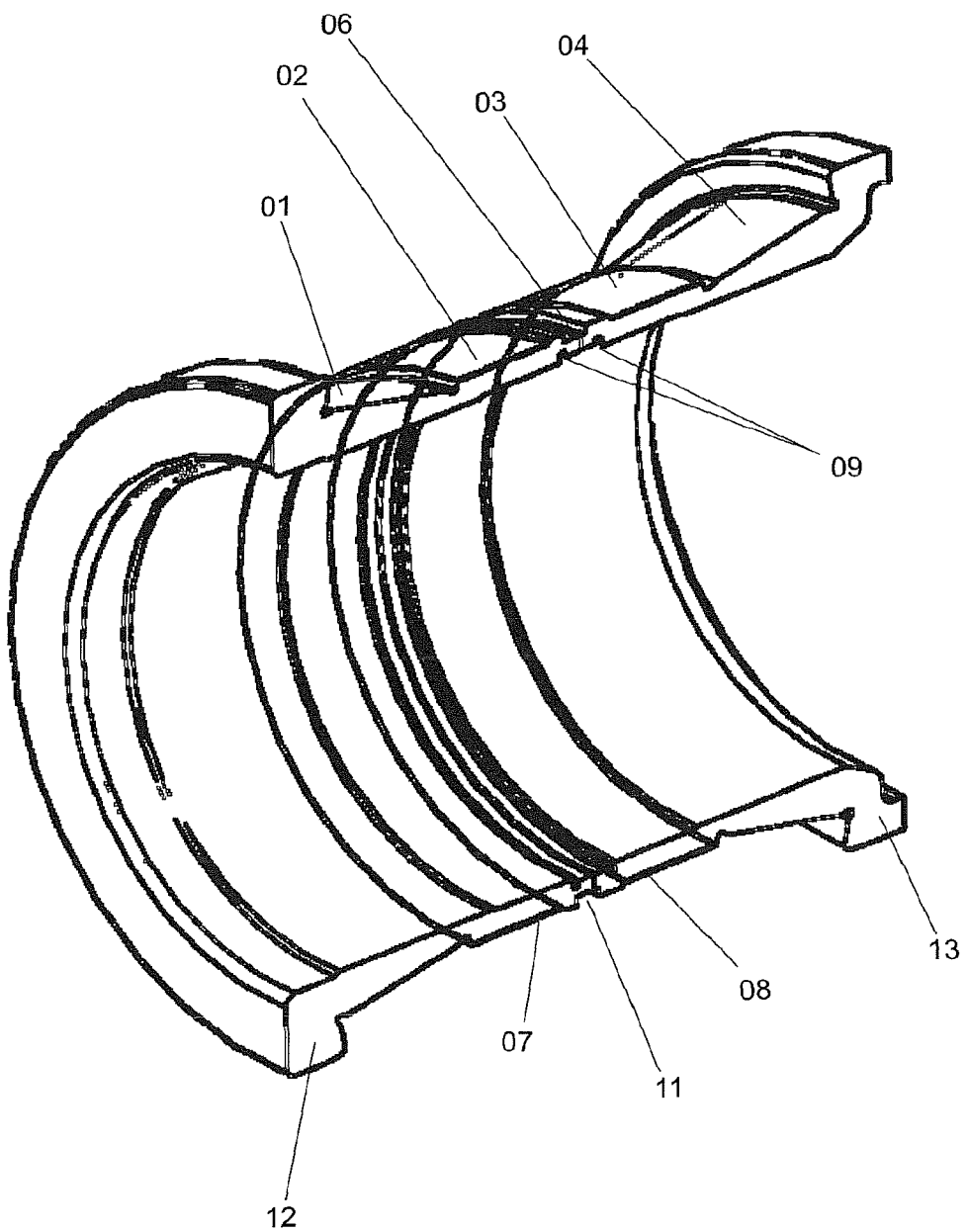
FIG. 1 is a bearing inner ring of a wheel bearing according to invention in a perspective sectional view.
Figure 2:
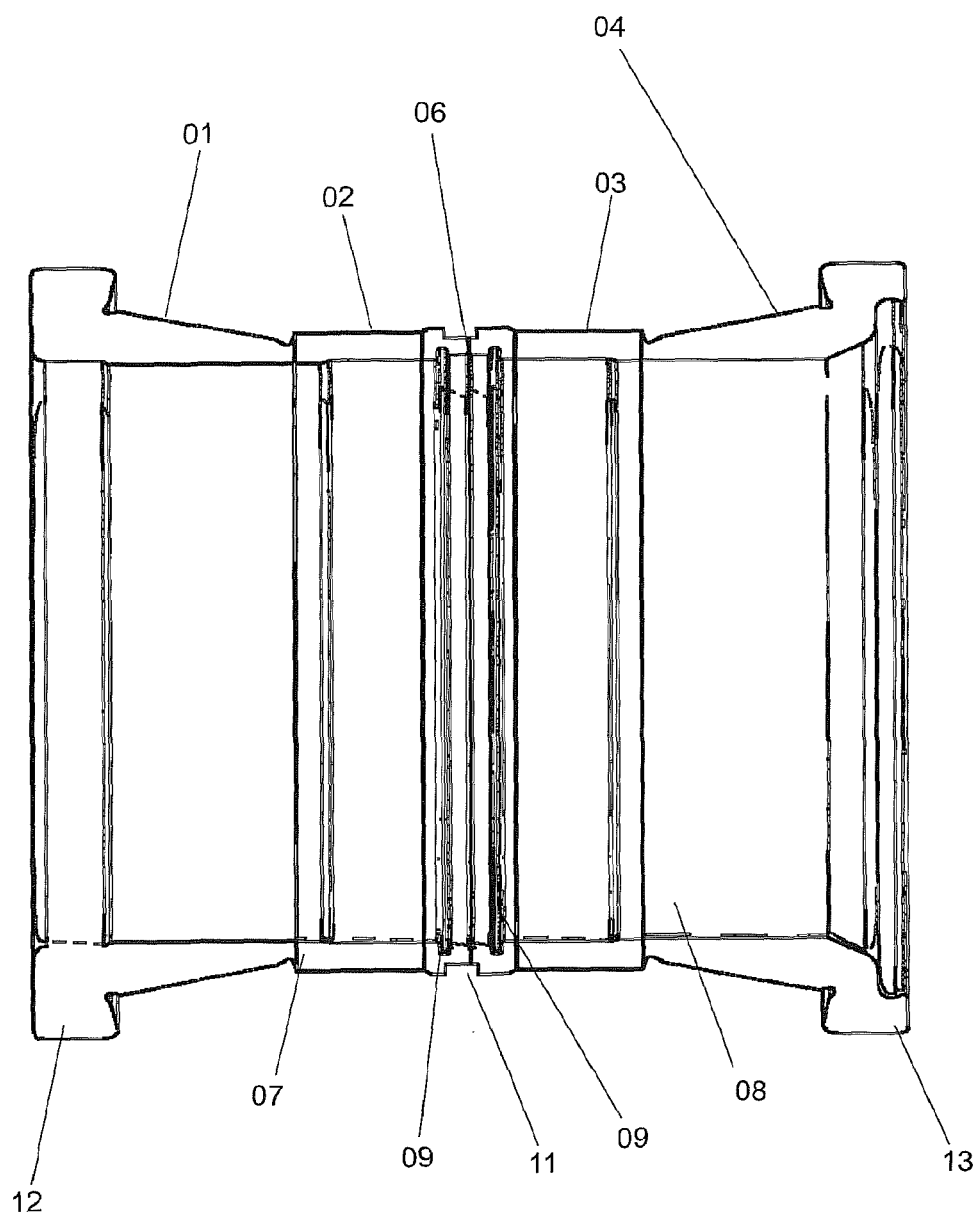
FIG. 2 is the bearing inner ring of FIG. 1 in another sectional view.

FIG. 1 shows a bearing inner ring of a wheel bearing formed as a rolling bearing of the present invention in a perspective sectional view. The wheel bearing can for example, be formed as a wheel bearing of a truck. The cutting plane of the displayed view lies in the axis of the wheel bearing. FIG. 2 shows the same cut as viewed from the front.

The wheel bearing whose bearing inner ring is shown in FIGS. 1 and 2 is designed as a double row tapered rolling bearing in which tapered rollers 22 act as rolling elements. A bearing interior is designed between the bearing outer ring 20 and the bearing inner ring in which the tapered rollers are arranged. The outer surface of the bearing inner ring is facing the inside of the bearing where the inner surface of the bearing inner ring serves the reception of a non-rotatable pin (not pictured).

Figure 4:
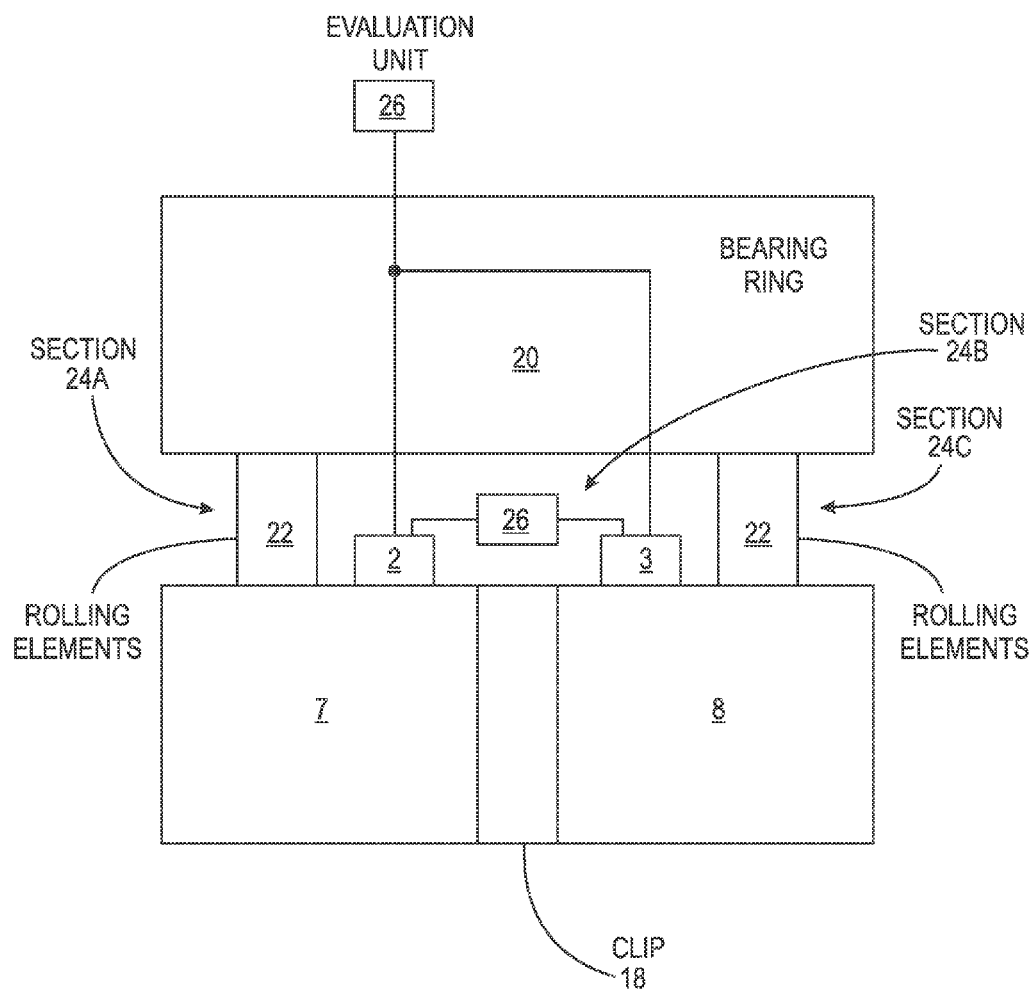
FIG. 4 is a schematic block diagram including the bearing inner ring of FIG. 1; and, FIG. 5 is the bearing inner ring of FIG. 1 in another sectional view showing respective strain gauges.
Figure 5:
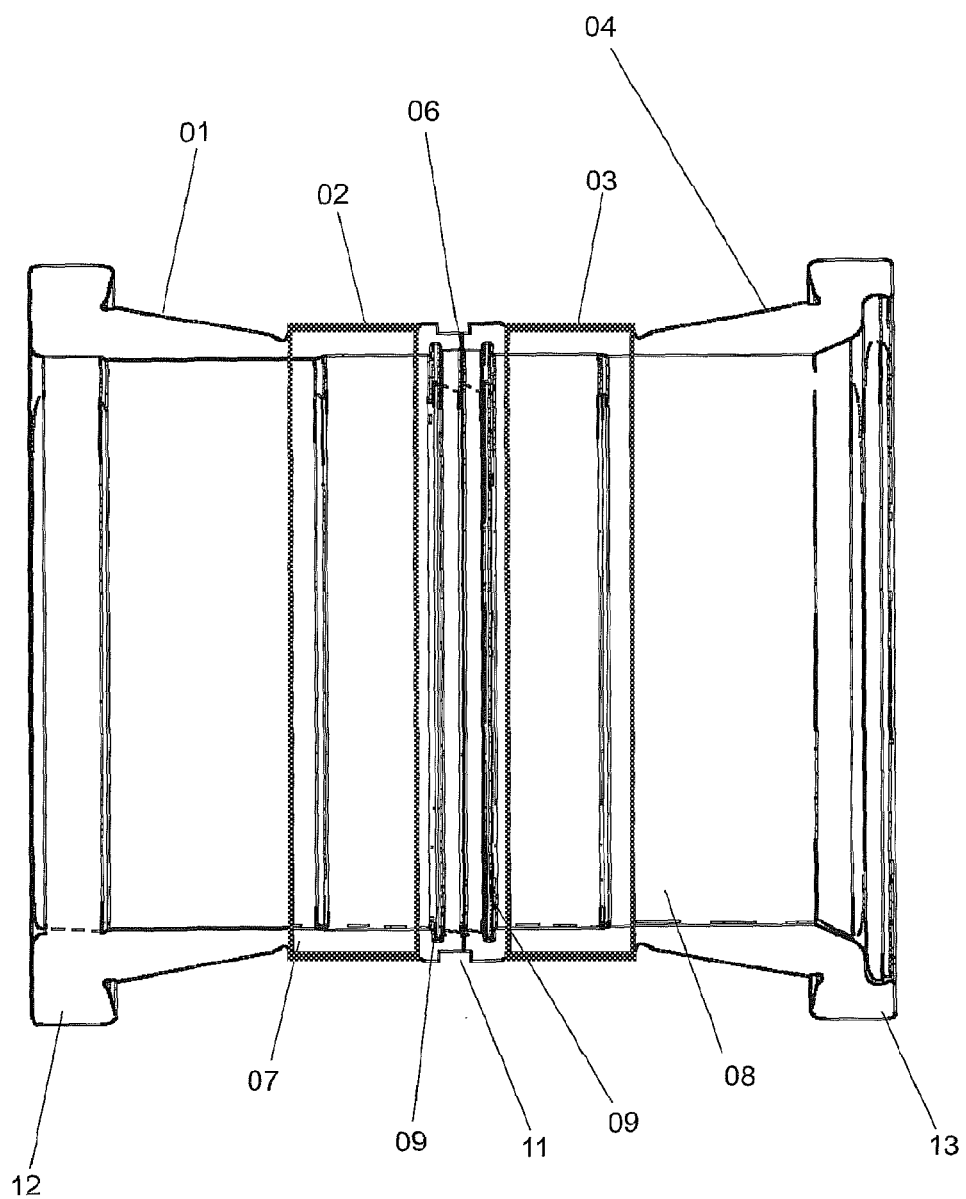

FIG. 4 is a schematic diagram showing inner bearing ring halves 7 and 8, clip 18, bearing ring 20, rolling elements 22, axial sections 24A, 24B, and 24C, and evaluation unit 26. Unit 26 is shown in integral and non-integral configurations. FIG. 5 is the bearing inner ring of FIG. 1 in another sectional view shown respective strain gauges. First of all, the bearing inner ring indicates first tread 01 on its outer surface where the tapered rollers are arranged in the first row. First tread 01 is located in the first axial segment of the bearing inner ring or the wheel bearing. In an example embodiment as shown in FIGS. 4 and 5, first strain gauge 02 and second strain gauge 03 are fastened on the outer surface of the bearing inner ring. First strain gauge 02 and second strain gauge 03 are extensively applied on the outer surface of the bearing inner ring. First strain gauge 02 and second strain gauge 03 are located in the second axial segment of the bearing inner ring or wheel bearing. When the wheel bearing is in its assembled state, first strain gauge 02 and second strain gauge 03 are located in the bearing inner ring so that they are formed in a second axial segment of the bearing inner ring. First strain gauge 02 and second strain gauge 03 serve the measurement of strains of the bearing inner ring, which occur due to the mechanical load of the bearing inner ring.

On the outer surface of the inner ring second tread 04 is located, on which the second row of the tapered rollers are arranged. Second tread 04 is located in a third axial section of the inner ring or the wheel bearing. Consequently, the tapered rollers of the second row are in the third axial section of the interior, while the tapered rollers of the first row are arranged in the axial section of the interior.

Coupling point 06 is located in the second axial section of the inner ring between first strain gauge 02 and second strain gauge 03, where first half 07 of the inner ring and second half 08 of the inner ring cast on to one another. On the inside of the inner ring are two grooves 09, which serve as clip 18, to hold together two halves 07, 08 of the inner ring. On the outer surface of the inner ring groove 11 is pictured, which serves as a sealing ring (not pictured). Two strain gauges 02, 03 allow the measurement of mechanical loads on both sides of coupling point 06.

Furthermore, the inner ring shows first board 12, which is trained in the fourth axial section of the inner ring and limits first tread 01. Also shown in the inner ring is second board 13, which is trained in the fifth axial section of the inner ring and limits second tread 04.

Figure 3:
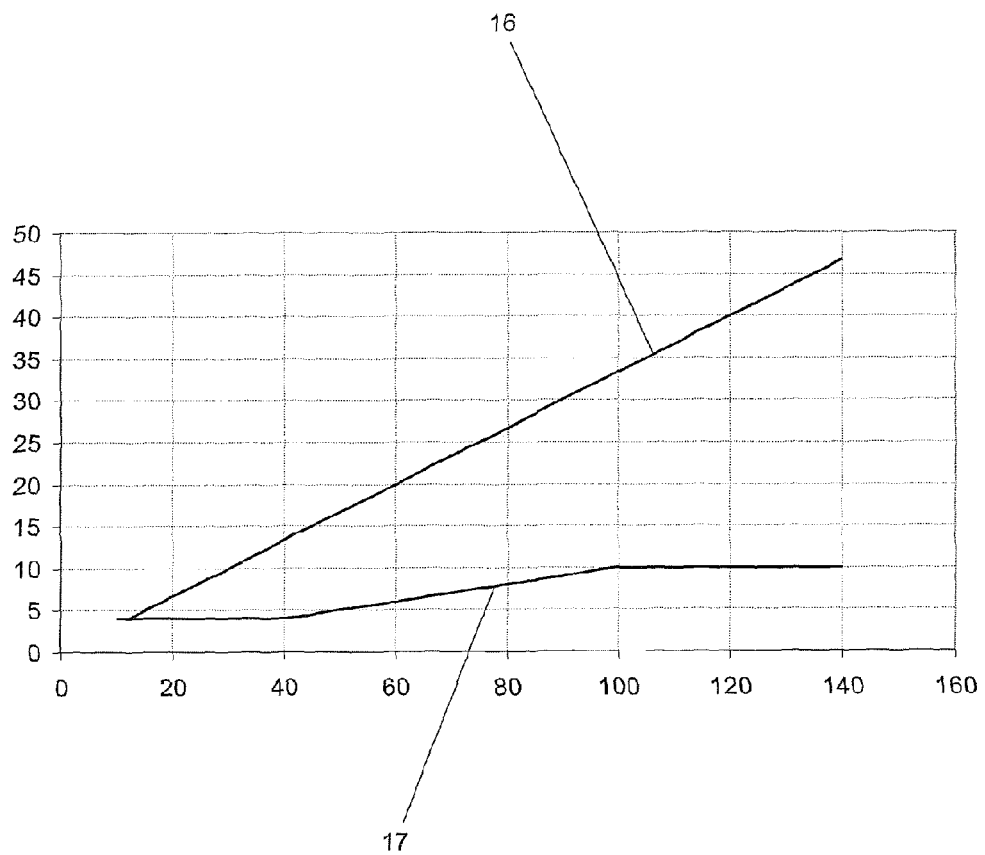
FIG. 3 is a diagram of an axial length of a second axial section of the bearing inner ring portrayed in FIG. 1.

FIG. 3 shows a diagram where the preferred limits for the axial length of the second axial section of the inner ring depicted in FIG. 1 are shown. On the x-axis of the diagram, the inner diameter of the inner ring is depicted in mm. On the y-axis of the diagram, the axial length of the second axial section of the inner ring is depicted in mm. First graph 16 shows the preferred maximum limits for the axial length of the second axial section of the inner ring. Second graph 17 shows the preferred minimum limits for the axial length of the second axial section of the inner ring.

On the axial wheel shown in FIG. 1, the axial lengths of the second axial portion of the inner ring and the second axial portion of the interior are the same.

List of reference numbers
01 first tread
02 first strain gauge
03 second strain gauge
04 second tread
05 -
06 coupling point
07 first half of the inner ring
08 second half of the inner ring
09 grooves
10 -

11 groove
12 first board
13 second board
14 -
15 -
16 first graph
17 second graph
18 clip
20 bearing outer ring
22 rolling elements
24A axial section
24B axial section
24C axial section
evaluation unit

What is claimed is:

1. A rolling bearing for rotatively mounting a machine element, comprising:
    a first bearing ring including first and second halves forming respective axial ends of the first bearing ring;
    a second bearing ring, rotatable with respect to the first bearing ring and located radially outward of the first bearing ring;
    a clip holding the first and second halves of the first bearing ring together;
    a bearing interior, having at least one first axial section formed between the first bearing ring and the second bearing ring;
    first rotatable rolling elements arranged in the at least one first axial section;
    a first strain sensor for measuring a first mechanical load acting on the first half of the first bearing ring and arranged in a second axial section of the bearing interior; and,
    a second strain sensor for measuring a second mechanical load acting on the second half of the first bearing ring and located in the second axial section of the bearing ring.

2. The rolling bearing as recited in claim 1, wherein:
    the first strain gage is fastened onto a first surface of the first bearing ring and said first surface is facing towards the bearing interior; and,
    the second strain gage is fastened onto a second surface of the second bearing ring and said second surface is facing towards the bearing interior.

3. The rolling bearing as recited in claim 1, wherein the second axial section of the bearing interior is arranged between the first axial section of the bearing interior, and a third axial section of the bearing interior.

4. The rolling bearing as recited in claim 3, wherein second rolling elements are arranged in the third axial section of the bearing interior.

5. The rolling bearing as recited in claim 4, wherein the first rolling elements in the first axial section of the bearing interior form a first row and the second rolling elements in the third axial section of the bearing interior form a second row.

6. The rolling bearing as recited in claim 5, wherein the second axial section of the bearing interior is arranged centrally between the first and second rows.

7. The rolling bearing as recited in claim 1, wherein the rolling bearing is a wheel bearing for supporting a wheel of a motor vehicle.

8. The rolling bearing as recited in claim 7, wherein the first bearing ring is formed by way of a bearing inner ring, and the second bearing ring is formed by way of a bearing outer ring, wherein the bearing outer ring is arranged to be fitted to a wheel hub in a torsion-resistant manner, and wherein the bearing inner ring is arranged to be mounted on a pin in a torsion-resistant manner.

9. The rolling bearing as recited in claim 1, wherein the second axial section of the bearing interior has an axial length which is between one tenth and one third of an inner diameter of a bearing inner ring forming one part of the two bearing rings.

10. The rolling bearing as recited in claim 1, wherein an axial length of the second axial section of the bearing interior is at least 4 mm.

11. The rolling bearing as recited in claim 1, wherein the rolling bearing further comprises an evaluation unit connected electronically to the first strain sensor and configured to determine a rotational speed of the rolling bearing.

12. The rolling bearing as recited in claim 1, wherein the rolling bearing further comprises an evaluation unit, connected electronically to the first strain sensor and configured to determine a force acting on the rolling bearing.

* * * * *